Sept. 24, 1946. T. H. EYLES 2,407,978
TOGGLE SYSTEM FOR INJECTION MOLDING MACHINES
Filed Feb. 24, 1945

INVENTOR
THOMAS H. EYLES.
BY
ATTORNEY

Patented Sept. 24, 1946

2,407,978

UNITED STATES PATENT OFFICE 2,407,978

TOGGLE SYSTEM FOR INJECTION MOLDING MACHINES

Thomas H. Eyles, Leominster, Mass., assignor to Fosgood Corporation, Leominster, Mass., a corporation of Massachusetts Application February 24, 1945, Serial No. 579,612

4 Claims. (Cl. 74—110)

This invention relates to a toggle system for an injection molding machine.

Injection molding machines operate to force a heated thermoplastic substance into the cavities of a die or mold under very high pressure, generally 20,000 pounds per square inch and upwards. The die usually comprises two parts or halves, a fixed part and a movable part. The latter is moved to and from the former by means of a pneumatically or hydraulically actuated toggle system. During injection of the thermoplastic substance into the die, the movable part is firmly and tightly pressed against the fixed part, and locked in that position, by the toggle-joints.

The toggle system comprises two toggle-joints each having two links hinged together, and each hinged to a part of the system by means of toggle pins. The toggle pins are supported at their ends only, the central portion or section of each being unsupported.

Due to the fact that the reaction force of the injection pressure is transmitted directly to the toggle pins, in the toggle systems heretofore used the pins have had a tendency to bend or buckle. Furthermore, undue stresses have been produced in the pins resulting in fatigue and causing breakage.

With these defects in mind, the principal object of my invention is to provide the toggle system with means for preventing deformation of the unsupported portions of the toggle pins by the reaction force of the injection pressure when the toggle-joints are in their locked position.

Figure 1:
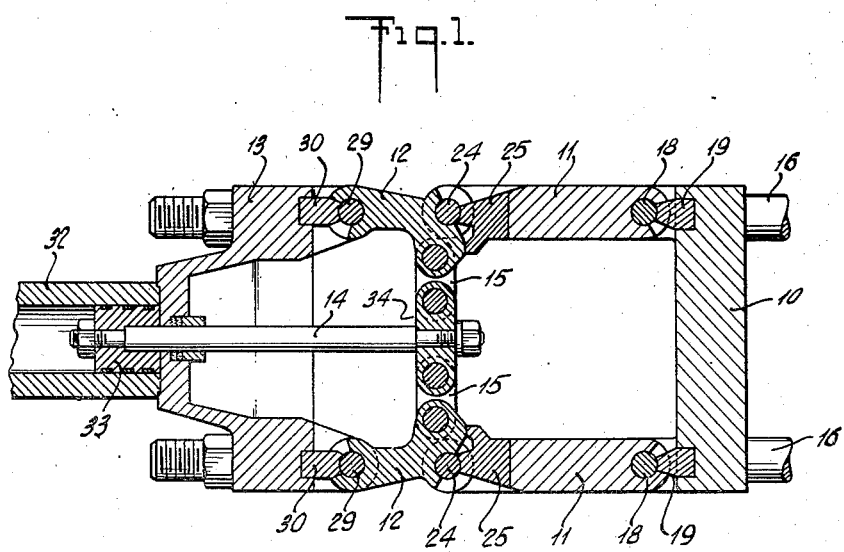
Figure 2:
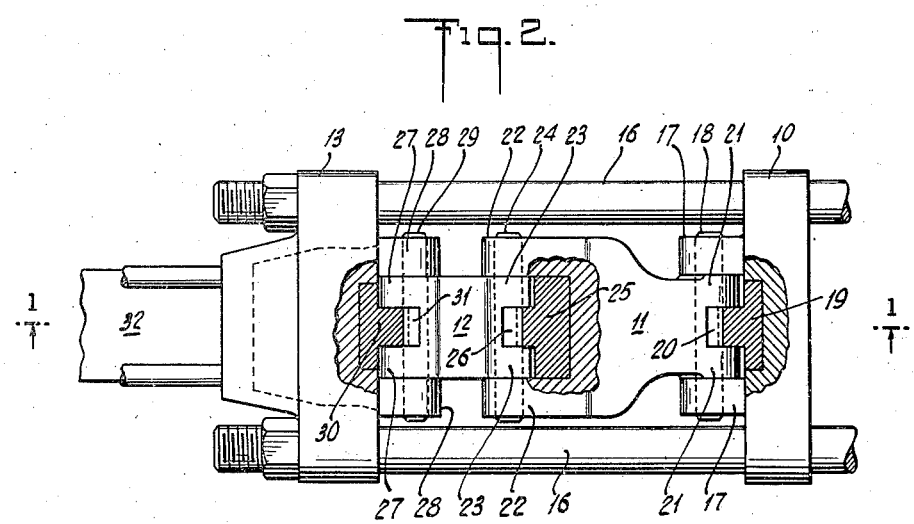

Other objects and advantages of the invention will appear from the following description thereof, reference being had to the accompanying drawing in which:

Figure 1 is a horizontal section of the toggle system in its closed or locked position, taken on the line 1—1 of Fig. 2, and Fig. 2 is a view in side elevation of the toggle system.

In the drawing I have shown only as much of the injection molding machine as is deemed necessary to a clear understanding of the invention.

The toggle system, in general, comprises a movable member 10, two toggle-joints each having a pair of links 11 and 12, a fixed member 13, a piston rod 14 for actuating the system, and links 15 connecting the piston rod with the toggle-joints. Since the two toggle-joints are alike, it will be necessary to describe only one.

The member 10 is in the form of a plate mounted to slide with a rectilinear reciprocating motion on guides 16. The plate carries the movable part of the die (not shown) which is detachably secured thereto in the conventional manner. Projecting from a face of the plate, opposite to that on which the die part is carried, are a pair of ears 17 in which the upper and lower ends of the pin 18 are fixed, and a lug or block 19 having a concave end that bears against the central portion 20 of the pin, i. e., the portion that extends between the forks 21 of the link 11. The bearing portion of the lug 19 is of about the same width as that of either of the ears 17. A slight clearance, of only a few thousandths of an inch, may be provided between the pin and the openings in the forks through which the pin passes for the reception of a lubricating film of grease. All of the hinged parts may be similarly lubricated.

The lug or block 19, as well as the lugs 25 and 30 may be made of hardened tool steel, or other material of the requisite strength and hardness. Furthermore, the lugs may be in the form of inserts, as shown, or they may be cast integral with the parts from which they project and suitably machined.

The other end of link 11 has forks 22 between which the forks 23 of link 12 are received. The two links are hinged together by a pin 24 passing through aligned openings in the fork 22. A lug or block 25 projects from the end of link 11 and bears against the central portion 26 of pin 24.

The forks 27 at the opposite end of link 12 are received between the ears 28 on the fixed member 13, and are hinged to the ears by a pin 29. A lug or block 30 projects from the member 13 and bears against the central portion 31 of pin 29. The member 13 serves as a head for the cylinder 32 in which the piston 33, that operates the rod 14, is mounted. The piston rod 14 carries a trunnion 34 that is connected by the links 15 to the toggle links 12. A track may be provided on which the trunnion may ride and by which it may be guided for positive rectilinear movement both in opening and closing the toggle-joints to prevent any unequal side thrust on the pins during locking.

When the toggle system is in its fully closed or locked position shown and the thermoplastic substance is being injected under high pressure into the cavities of the die, the lugs or blocks 19, 25, and 30, by bearing against the unsupported central portion or section of the toggle pins, will resist the bending moment that the reaction force of the injection pressure tends to create in the pins, and will prevent the pins from being deformed thereby.

Various modifications may be made in the details of construction herein described and illustrated within the spirit and scope of the invention.

What I claim is:

1. In an injection molding machine, a toggle system comprising a fixed member, a movable member, toggle-joints connecting said members, means for actuating the toggle-joints, each toggle-joint having two links formed with forked ends, toggle pins passing through the forked ends for hinging the links to the fixed and movable members and to each other, and lugs bearing against the portion of the pins that extends between the forks to resist the bending moment that the reaction force of the injection pressure tends to create in the pins and to prevent deformation of the pins.

2. In an injection molding machine, a toggle system comprising a fixed member, a movable member, guides on which the movable member slides with a rectilinear reciprocating motion, toggle-joints connecting said members, means for actuating the toggle-joints, each toggle-joint having two links formed with forked ends, toggle pins passing through the forked ends for hinging the links to the fixed and movable members and to each other, and lugs bearing against the portion of the pins that extends between the forks to resist the bending moment that the reaction force of the injection pressure tends to create in the pins and to prevent deformation of the pins.

3. In an injection molding machine, a toggle system comprising a fixed member, a movable member, toggle-joints connecting said members, piston operated means for actuating the toggle-joints, each toggle joint having two links formed with forked ends, toggle pins passing through the forked ends for hinging the links to the fixed and movable members and to each other, and lugs bearing against the portion of the pins that extends between the forks to resist the bending moment that the reaction force of the injection pressure tends to create in the pins and to prevent deformation of the pins.

4. In an injection molding machine, a toggle system comprising a fixed member, a movable member, toggle-joints connecting said members, means for actuating the toggle-joints, each toggle-joint having two links, toggle pins hinging said links together and to the fixed and movable members, said pins being supported at their ends, and means bearing against a portion of the pins intermediate their ends to resist the reaction force of the injection pressure and to prevent deformation of the pins.

THOMAS H. EYLES.